(12) United States Patent
Gram (10) Patent No.: US 7,452,202 B2
(45) Date of Patent: Nov. 18, 2008

(54) MACHINERY FOR THE MOLDING AND ASSEMBLING OF AN ASSEMBLED OBJECT

(76) Inventor: Jes Tougaard Gram, c/o Gram Technology, Inc., 10625 Pinnacle Peak Rd., Scottsdale, AZ (US) 85255

( * ) Notice: Subject to any disclaimer, the term of this patent is extended or adjusted under 35 U.S.C. 154(b) by 0 days.

(21) Appl. No.: 11/342,511

(22) Filed: Jan. 30, 2006

(65) Prior Publication Data

US 2006/0127526 A1    Jun. 15, 2006

Related U.S. Application Data

(62) Division of application No. 10/415,281, filed as application No. PCT/DK01/00699 on Oct. 23, 2001, now Pat. No. 7,081,222.

(30) Foreign Application Priority Data

Oct. 26, 2000    (DK) ............................... 2000 01605

(51) Int. Cl.
    *B29C 45/04*    (2006.01)
(52) U.S. Cl. .................. 425/588; 425/515; 425/517; 425/572; 425/576; 264/250; 264/255; 264/328.8
(58) Field of Classification Search .................. 425/233, 425/395, 404, 446, 508, 515, 520, 576, 588, 425/116, 119, 182, 188, 190, 192 R, 521, 425/517, 572, 581, 439, 436 RM, 574; 264/241, 264/242, 244, 249, 250, 254, 255, 259, 275, 264/297.1, 297.2, 297.3, 328.1, 328.8, 328.11; 156/500, 60

See application file for complete search history.

(56) References Cited

U.S. PATENT DOCUMENTS 3,825,457 A * 7/1974 Holroyd et al. ............. 156/147
4,744,741 A * 5/1988 Glover et al. ............... 425/123
5,015,425 A * 5/1991 Mimata et al. ................ 264/39
5,221,538 A * 6/1993 Gasami et al. .............. 425/127

(Continued)

FOREIGN PATENT DOCUMENTS

DE           4123690           2/1992

*Primary Examiner*—Philip C Tucker
*Assistant Examiner*—Dimple N Bodawala
(74) *Attorney, Agent, or Firm*—Edward J. Chalfie (57) ABSTRACT

The invention concerns machinery for molding and assembling of at least two part objects and of plastics, e.g. two ball shells, which can be assembled to a hollow ball, as molding and assembly can take place in the same tool and continuously in the same work procedure. This can be realized by the two turnable middle parts and of the tool, respectively are supplied with the mold cavities and, where the assembling of the part objects and can take place, when the respective tool cavities meet during the rotation, at the same time as the closing of the mold. During the closing there can simultaneously be molded new part objects and in the opposite placed mold cavities and in the two turnable mold part and. If it is necessary in respect of the material or the design of the part objects, there can after the molding of the part objects be applied e.g. heat on the respective boundary surfaces, which shall shape the assembling. This can suitably be fit into the steps, which the turnable middle parts and run through. The part objects and can possibly as well as be assembly by a snap- or click function, which is a pure mechanical assembling.

15 Claims, 4 Drawing Sheets

U.S. PATENT DOCUMENTS

| | | | |
|---|---|---|---|
| 5,256,048 A * | 10/1993 | Jacobs et al. | 425/130 |
| 5,268,183 A * | 12/1993 | Garza | 425/116 |
| 5,358,397 A * | 10/1994 | Ligon et al. | 425/145 |
| 6,322,738 B1 * | 11/2001 | Sicilia et al. | 264/255 |
| 6,386,849 B1 * | 5/2002 | Kroeger et al. | 425/112 |
| 6,447,280 B1 * | 9/2002 | Grimm | 425/116 |
| 6,461,141 B1 * | 10/2002 | Harrison et al. | 425/556 |
| 6,702,469 B1 * | 3/2004 | Taniguchi et al. | 384/418 |
| 7,081,222 B2 * | 7/2006 | Gram | 264/234 |
| 7,128,553 B2 * | 10/2006 | Shakal | 425/190 |
| 7,150,845 B1 * | 12/2006 | Gram | 264/254 |
| 7,165,964 B2 * | 1/2007 | Schuessler | 425/429 |
| 2001/0009307 A1 * | 7/2001 | Abrams et al. | 264/40.5 |

* cited by examiner

MACHINERY FOR THE MOLDING AND ASSEMBLING OF AN ASSEMBLED OBJECT

RELATED U.S. APPLICATION DATA

This application is a divisional of U.S. application Ser. No. 10/415,281, filed on Apr. 28, 2003, now U.S. Pat. No. 7,081,222, which is a 371 of PCT/DK01/00699, filed on Oct. 23, 2001. This application claim benefit of foreign application DENMARK PA 2000 01605, filed on Oct. 26, 2005.

BACKGROUND OF THE INVENTION

1. Field of the Invention

The invention concerns a procedure and machinery for molding and assembling of an in at least two part objects molded object preferably of plastics in a tool comprising at least one turnable and/or displaceable middle part.

2. Description of the Related Art

There is known other procedures and machineries for the molding and assembling of plastic parts in tools with a turnable middle part. Thus there in my international patent application PCT No. DK/98/00034 are described turnable middle parts, which enables the use of the so called stack molding technique in multi component molding, where you mold assembled plastic parts.

For plastic objects, which normally cannot be molded with a cavity because of the shape of the core or of complicated geometries, you have at injection molding normally molded the object in two halves and assembled them afterwards outside the molding machine.

The hitherto known procedures and machineries for assembling or molding of such objects normally involve, that you apply assembling- and welding machines to achieve these objects with cavities, where it is not possible to achieve the desired geometries in another way than by using e.g. various blow molding techniques.

BRIEF SUMMARY OF THE INVENTION

The procedure and the machinery according to the invention is intended to combine the above mentioned technology with the likewise known assembling technique, but here in one and the same tool, whereby there can be achieved large improvements of productivity.

The procedure according to the invention is characterized by the fact, that there in at least one of the boundary surfaces between the parts of the tool, which are furnished with turnable/displaceable tool cavities and/or cores, occurs an assembling of the parts e.g. by welding or another kind of assembling of at least two parts of the in the tool molded object(s).

A more precise account for the benefits by the procedure and machinery according to the invention will appear from the description and the drawings.

DETAILED DESCRIPTION OF THE PREFERRED EMBODIMENTS

Figure 1:
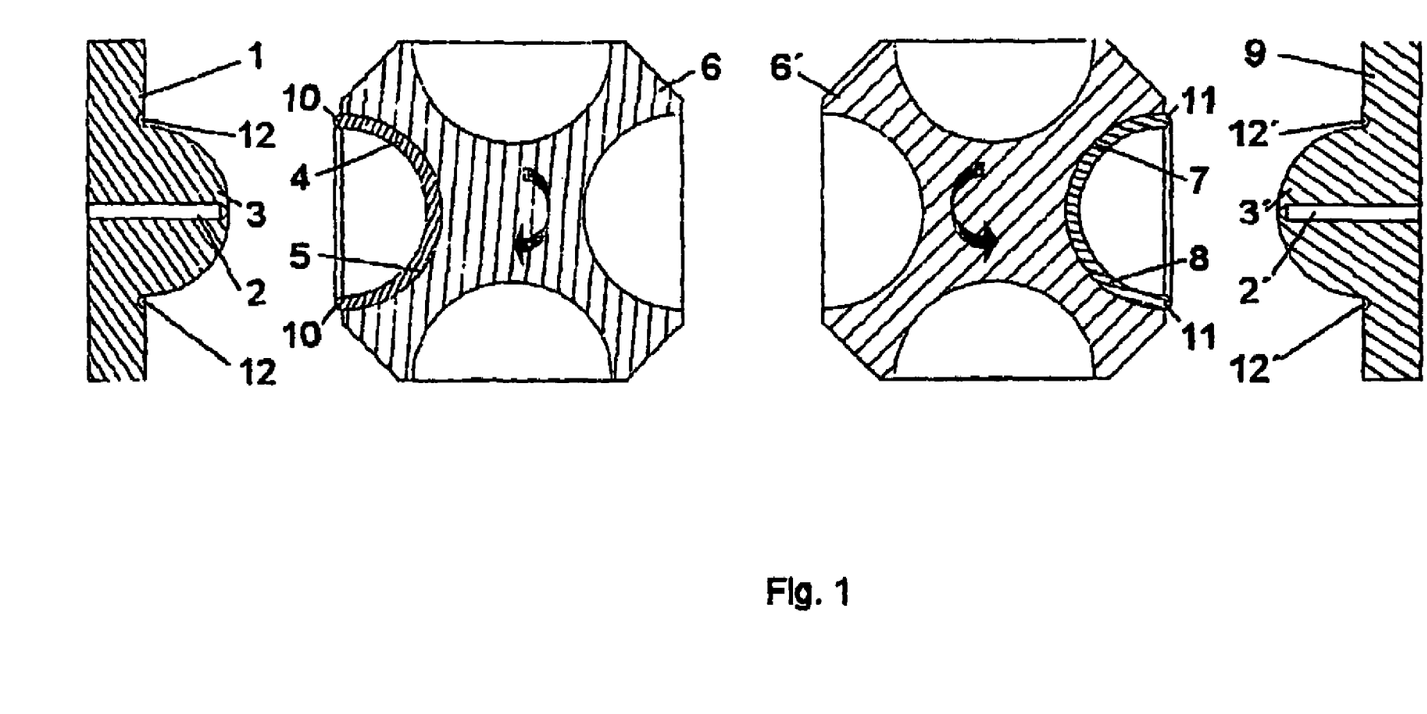
FIG. 1 shows a cross section of the tool according to the invention seen from above.

On FIG. 1 is, seen from above, shown a section of a tool for the exercise of the procedure according to the invention. From the left is seen the stationary tool part 1 with a hot-runner furnished inlet 2, which directs the material further through the core 3. The tool is on the figure just opened after the first part object 4 is molded in the cavity 5 in the left of the two turnable middle parts 6 through the inlet 2 and the core 3. At the same time there is in the cavity 7 in the right of the two turnable middle parts 6' molded another part object 8 with material from that with the inlet 2' and the core 3' furnished movable mold part 9. The two part objects 4 and 8 consist on the drawing of two uniform half ball shaped shells, that later is intended to be put together to a hollow ball. It will be noticed, that this assembling will be eased by the outermost boundary surfaces 10 and 11 on the respective part objects 4 and 8 exceed out from the turnable middle parts. This is accomplished by there are similar undercuts 12 and 12' in respectively the stationary mold part 1 and the movable mold part 9: As it appears from the figure both the turnable middle parts 6 and 6', which in principle has a square formed section, have got their corners removed, so that they require a lesser opening of the tool for being able to turn around. Finally shall be mentioned, that identical cross sections of the on the figure showed can be seen e.g. five places underneath the shown, if the tool is designed for producing in total six assembled objects pr. cycle.

Figure 2:
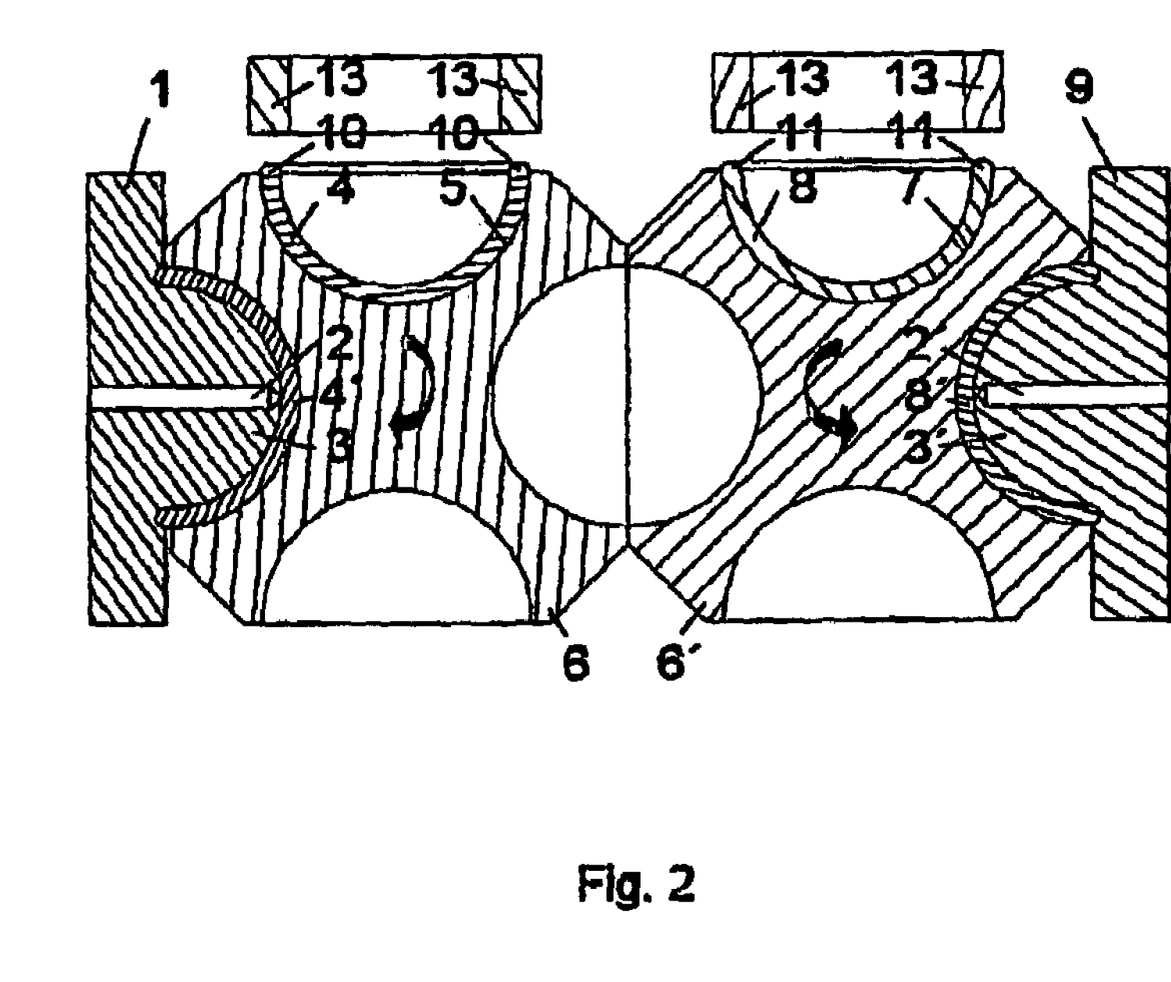
FIG. 2 shows the same, where the turnable middle part is turned 90 degrees in the direction of the arrow.

In FIG. 2 is shown the same section, but where the two turnable middle parts 6 and 6' both are turned 90 degrees in the direction of the respective arrows, whereby the two part objects 4 and 8 have reached the on the figure highest position. Here heat is applied on their respectively boundary surfaces 10 and 11 from the movable heat units 13. The tool is meanwhile preferably closed, and the two subsequent part objects 4' and '8' are just being molded through the two inlets 2 and 2' and the cores 3 and 3' in respectively the stationary mold part 1 and the movable mold part 9.

Figure 3:
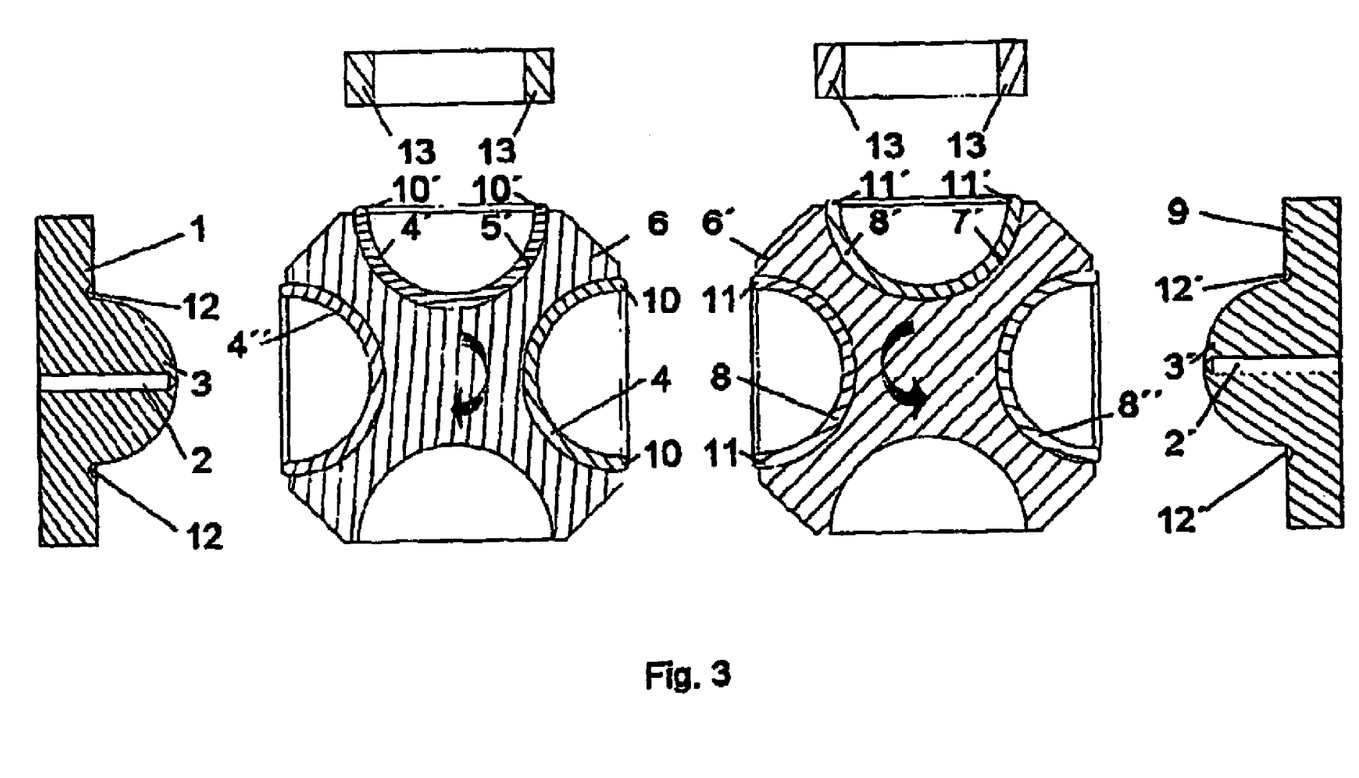
FIG. 3 shows the same, where the middle part is turned additional 90 degrees.

FIG. 3 shows the same section, where the two turnable middle parts 6 and 6' both are turned additional 90 degrees in the direction of the respective arrows. The tool is here open, but moving towards closing, where the two part objects 4 and 8 will approach their two respective heated boundary surfaces 10 and 11 to each other before the welding together. The two following part objects 4' and 8' are now in their on the figure highest position, where they are receiving heat on their respective boundary surfaces 10' and 11' from the movable heat units 13. Finally the third set of part objects 4" and 8" are just being molded in the mold cavities 5" and 7", both the part objects are finished and ready for being turned away from their respective cores 3 and 3'.

Figure 4:
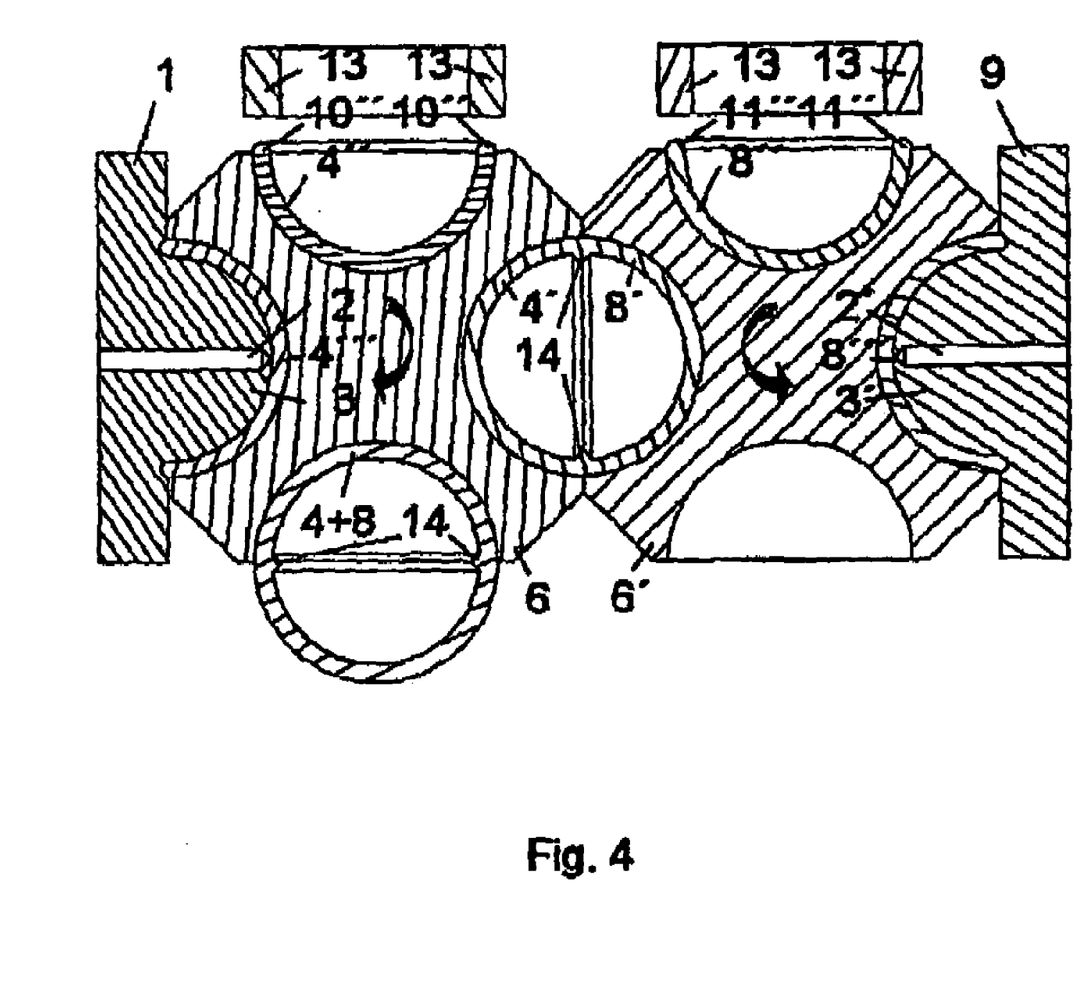
FIG. 4 shows the same, where the middle part is turned another additional 90 degrees.

On FIG. 4 the two turnable middle parts 6 and 6' are turned another additional 90 degrees. Here the tool is closed, and the two part objects 4 and 8 now are melted together to the finished object, the hollow ball 4+8, which on the figure just is being ejected from the tool. It is noticed, that possible surplus material 14 suitably only exists on the inner side of the ball shell. The two following part objects 4' and 8' are here seen during the welding of their boundary surfaces 10' and 11' in the closed mold, and the third set of part objects 4" and 8" is getting their respective boundary surfaces 10" and 11" heated by the movable heating units 13. Finally has the fourth set of part objects 4''' and 8''' just been molded at their respective cores 3 and 3'.

Hereby the first sequence of the two turnable middle parts 6 and 6' is terminated. By the next turning of 90 degrees a new molding- and assembling cycle is started, as the first, where all four sides of each of the two turnable middle parts 6 and 6' are in full function. Hereafter a continuous production of part objects and the assembling hereof can continue after the same principles.

The on the drawing shown is just a single example of how the procedure and the machinery of the invention can be realized. This should however be sufficient to show the fundamental principles of the invention.

However there could also have been shown other versions of the procedure and the machinery according to the invention. Thus could the two object parts after their assembling a bottle or another kind of container. This can be realized by the turnable middle parts instead of the on the drawing shown cavities have outgoing cores/core parts, which could make the design of the opening of the bottle. It will likewise be seen, that more technical objects with a difficult geometry preferably could be produced after the procedure according to the invention, which in all respects provides entire new possibilities for the designing of molded objects.

It shall also be noticed that the on the drawing shown step by applying heat possibly can be avoided, if e.g. the material, the design of the object or the velocity of the movement allows this. This is e.g. also the case, if the part objects solely have to be assembled by a pure mechanical assembling, such as a snap- or click function. E.g. in stead of the step in the movement, where heat is applied, the part objects can be supplied with other things, such as electronics, fluid or metal parts, which shall be included in the assembled object.

The invention claimed is:

1. Machinery for molding and assembling two-part plastic objects, said machinery comprising:
   first and second rotatable molds, each mold having at least two mold cavities formed therein;
   a first forming position alignable with said mold cavities of said first mold where plastic is introduced into one of said mold cavities of said first mold to form a first subpart when said first forming position and said one of said mold cavities of said first mold are aligned;
   a second forming position alignable with said mold cavities of said second mold where plastic is introduced into one of said mold cavities of said second mold to form a second subpart when said second forming position and one of said mold cavities of said second mold are aligned; and
   an assembly position aligned with and intermediate to said first and second forming positions where said first subpart and said second sub-part in opposing mold cavities are joined when said one of said mold cavities of said first mold and one of said mold cavities of said second mold are aligned;
   wherein the at least two mold cavities in each mold have identical configurations to enable a first set of said first and second subparts to be mechanically assembled together at said assembly position while a second set of said first and second sub-parts is being simultaneously formed at said forming positions.

2. Machinery according to claim 1 wherein said forming positions include a tool part and an injection molding inlet for introducing molten plastic.

3. Machinery according to claim 1 wherein each rotatable mold has four sides, each side being orientated perpendicular to an adjacent side.

4. Machinery according to claim 1 further including an at least one applying position associated with said assembly position.

5. Machinery according to claim 4 wherein at least one applying position includes a heat unit to apply heat to an edge of said part.

6. Machinery according to claim 1 further including an ejection position associated with one of said rotatable molds to eject a finished object from said mold cavities, located whereby said rotatable mold rotates 90 degrees from the assembly position to the election position.

7. Machinery according to claim 1 wherein at least one of said molds is movable in a transverse direction relative to the other of said molds.

8. Machinery for molding and assembling two-part plastic objects, said machinery comprising:
   first and second rotatable molds, each mold having at least two mold cavities formed therein, each of said molds having and rotatable on its own vertical axis of rotation;
   a first forming position alignable with said mold cavities of said first mold where plastic is introduced into one of said mold cavities of said first mold to form a first subpart when said first forming position and one of said mold cavities of said first mold are aligned;
   a second forming position alignable with said mold cavities of said second mold where plastic is introduced into one of said mold cavities of said second mold to form a second subpart when said second forming position and one of said mold cavities of said second mold are aligned; and
   an assembly position aligned with and intermediate to said axes of rotation where said first subpart and said second subpart in opposing mold cavities are joined when one of said mold cavities of said first mold and one of said mold cavities of said second mold are aligned;
   wherein the at least two mold cavities in each mold have identical configurations to enable a first set of said first and second subparts to be mechanically assembled together at said assembly position while a second set of said first and second sub-parts is being simultaneously formed at said forming positions.

9. Machinery according to claim 8 wherein said first and second forming positions are aligned with and distal to said axes of rotation.

10. Machinery according to claim 8 wherein said forming positions include a tool part and an injection molding inlet for introducing molten plastic.

11. Machinery according to claim 8 wherein each rotatable mold has four sides, each side being orientated perpendicular to an adjacent side.

12. Machinery according to claim 8 further including at least one applying position associated with said assembly position.

13. Machinery according to claim 12 wherein at least one applying position includes a heat unit to apply heat to an edge of said part.

14. Machinery according to claim 8 further including an ejection position to eject a finished object from said mold cavities.

15. Machinery according to claim 8 wherein at least one of said molds is movable in a transverse direction perpendicular to an axis of rotation for said movable mold.

* * * * *

(12) EX PARTE REEXAMINATION CERTIFICATE (8035th)
United States Patent
Gram (10) Number: US 7,452,202 C1
(45) Certificate Issued: Feb. 15, 2011

(54) MACHINERY FOR THE MOLDING AND ASSEMBLING OF AN ASSEMBLED OBJECT

(76) Inventor: Jes Tougaard Gram, c/o Gram Technology, Inc. 10625 Pinnacle Peak Rd., Scottsdale, AZ (US) 85255

Reexamination Request:
No. 90/009,354, Dec. 8, 2008

Reexamination Certificate for:
Patent No.: 7,452,202
Issued: Nov. 18, 2008
Appl. No.: 11/342,511
Filed: Jan. 30, 2006

Related U.S. Application Data

(62) Division of application No. 10/415,281, filed as application No. PCT/DK01/00699 on Oct. 23, 2001, now Pat. No. 7,081,222.

(30) Foreign Application Priority Data

Oct. 26, 2000 (DK) .......................... 2000 01605

(51) Int. Cl.
*B29C 45/04* (2006.01)

(52) U.S. Cl. .................. 425/588; 425/515; 425/517; 425/572; 425/576; 264/250; 264/255; 264/328.8

(58) Field of Classification Search .......... None
See application file for complete search history.

(56) References Cited

U.S. PATENT DOCUMENTS 4,295,814 A    10/1981   Rosenberg .................. 425/517
5,915,760 A     6/1999   Kawase et al. ................ 29/883
6,206,681 B1    3/2001   Kawase et al. .............. 425/517

FOREIGN PATENT DOCUMENTS

DE   41 23 690 A1    3/2002
EP   0 920 979       6/1999
EP   1 060 868 A1   12/2000
JP   63135214        6/1988

*Primary Examiner*—Krisanne Jastrzab (57) ABSTRACT

The invention concerns machinery for molding and assembling of at least two part objects and of plastics, e.g. two ball shells, which can be assembled to a hollow ball, as molding and assembly can take place in the same tool and continuously in the same work procedure. This can be realized by the two turnable middle parts and of the tool, respectively are supplied with the mold cavities and, where the assembling of the part objects and can take place, when the respective tool cavities meet during the rotation, at the same time as the closing of the mold. During the closing there can simultaneously be molded new part objects and in the opposite placed mold cavities and in the two turnable mold part and. If it is necessary in respect of the material or the design of the part objects, there can after the molding of the part objects be applied e.g. heat on the respective boundary surfaces, which shall shape the assembling. This can suitably be fit into the steps, which the turnable middle parts and run through. The part objects and can possibly as well as be assembly by a snap- or click function, which is a pure mechanical assembling.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6 and 8 are determined to be patentable as amended.

Claims 2-5, 7 and 9-15, dependent on an amended claim, are determined to be patentable.

New claims 16 and 17 are added and determined to be patentable.

1. Machinery for molding and assembling two-part plastic objects, said machinery comprising:
    first and second rotatable molds, each mold having at least two mold cavities formed therein, *each mold having and rotatable on it own axis of rotation, each of said mold cavities facing radially outward from its respective axis of rotation*;
    a first forming position alignable with said mold cavities of said first mold where plastic is introduced *from an inlet of a first external core or cavity* into one of said mold cavities of said first mold to form a first sub-part when said first forming position and said one of said mold cavities of said first mold are aligned;
    a second forming position alignable with said mold cavities of said second mold where plastic is introduced *from an inlet of a second external core or cavity* into one of said mold cavities of said second mold to form a second subpart when said second forming position and one of said mold cavities of said second mold are aligned;
    an assembly position aligned with and intermediate to said first and second forming positions where said first subpart and said second sub-part in opposing mold cavities are joined when said one of said mold cavities of said first mold and one of said mold cavities of said second mold are aligned;
    wherein the at least two mold cavities in each mold have [identical] *complementary* configurations to enable a first set of said first and second subparts to be *moved together and* mechanically *and directly* assembled together at said assembly position while a second set of said first and second sub-parts is being simultaneously formed at said forming positions.

6. Machinery according to claim 1 further including an ejection position associated with one of said rotatable molds to eject a finished object from said mold cavities, located whereby said rotatable mold rotates 90 degrees from the assembly position to the [election] *ejection* position.

8. Machinery for molding and assembling two-part plastic objects, said machinery comprising:
    first and second rotatable molds, each mold having at least two mold cavities formed therein, each of said molds having and rotatable on its own [vertical] axis of rotation, *each of said mold cavities facing radially outward from its respective axis of rotation*;
    a first forming position alignable with said mold cavities of said first mold where plastic is introduced *from an inlet of a first external core or cavity* into one of said mold cavities of said first mold to form a first sub-part when said first forming position and one of said mold cavities of said first mold are aligned;
    a second forming position alignable with said mold cavities of said second mold where plastic is introduced *from an inlet of a second external core or cavity* into one of said mold cavities of said second mold to form a second subpart when said second forming position and one of said mold cavities of second mold are aligned; and
    an assembly position aligned with and intermediate to said axes of rotation where said first subpart and said second subpart in opposing mold cavities are joined when one of said mold cavities of said first mold and one of said mold cavities of said second mold are aligned;
    wherein the at least two mold cavities in each mold have [identical] *complementary* configurations to enable a first set of said first and second subparts to be *moved together and* mechanically *and directly* assembled together *after the mold is closed* at said assembly position while a second set of said first and second sub-parts is being simultaneously formed at said forming positions.

*16. Machinery for molding and assembling two-part plastic objects, said machinery comprising:*
    *first and second rotatable molds, each mold having at least two mold cavities formed therein, each of said molds having and rotatable on its own axis of rotation, each of said mold cavities facing radially outward from its respective axis of rotation;*
    *a first forming position alignable with said mold cavities of said first mold where plastic is introduced from an inlet of a first external core or cavity into one of said mold cavities of said first mold to form a first sub-part when said first forming position and one of said mold cavities of said first mold are aligned;*
    *a second forming position alignable with said mold cavities of said second mold where plastic is introduced from an inlet of a second external core or cavity into one of said mold cavities of said second mold to form a second subpart when said second forming position and one of said mold cavities of said second mold are aligned; and*
    *an assembly position aligned with and intermediate to said axes of rotation where said first subpart and said second subpart in opposing mold cavities are joined when one of said mold cavities of said first mold and one of said cavities of said second mold are aligned;*
    *wherein the at least two mold cavities in each mold have complementary configurations to enable a first set of said first and second sub-parts to be mechanically and directly assembled together by a snap or click function at said assembly position while a second set of said first and second sub-parts is being simultaneously formed at said forming positions.*

*17. Machinery for molding and assembling two-part plastic objects, said machinery comprising:*
    *first and second rotatable molds, each mold having at least two mold cavities formed therein, each of said* molds having and rotatable on its own axis of rotation, each of said mold cavities facing radially outward from its respective axis of rotation;

a first forming position alignable with said mold cavities of said first mold where plastic is introduced from an inlet of a first external core or cavity into one of said mold cavities of said first mold to form a first sub-part when said first forming position and one of said mold cavities of said first mold are aligned;

a second forming position alignable with said mold cavities of said second mold where plastic is introduced from an inlet of a second external core or cavity into one of said mold cavities of said second mold to form a second subpart when said second forming position and one of said mold cavities of said second mold are aligned; and an assembly position aligned with and intermediate to said axes of rotation where said first subpart and said second subpart in opposing mold cavities are joined when one of said mold cavities of said first mold and one of said cavities of said second mold are aligned;

wherein the at least two mold cavities in each mold have complementary configurations to enable a first set of said first and second sub-parts to be mechanically and directly assembled together by a snap or click function during the closing movement of the mold at said assembly position and a second set of said first and second sub-parts to be formed at said forming positions.

* * * * *